United States Patent [19]

Mitsuo

[11] Patent Number: 5,534,292
[45] Date of Patent: Jul. 9, 1996

[54] METHOD FOR PRODUCING AND CURING HYDRAULIC MATERIAL

[76] Inventor: Koji Mitsuo, Miyazaka 1 Chome 28 Ban 7 Go Mezon Wada 402, Tokyo-to, Setagaya-Ku, Japan

[21] Appl. No.: 960,648

[22] Filed: Oct. 14, 1992

Related U.S. Application Data

[63] Continuation-in-part of Ser. No. 761,746, Sep. 17, 1991, abandoned.

[30] Foreign Application Priority Data

Oct. 15, 1991 [JP] Japan ................... 3-331089

[51] Int. Cl.$^6$ .................... B05D 3/14; C04B 7/00
[52] U.S. Cl. .................. 427/228; 264/29.4; 264/42; 264/79; 264/133; 264/333; 264/336; 264/405; 427/393.6
[58] Field of Search .................. 264/333, 133, 264/29.1, 29.4, 25, 79, 42, 336; 427/228, 393.6, 226

[56] References Cited

U.S. PATENT DOCUMENTS

| | | | |
|---|---|---|---|
| Re. 32,673 | 5/1988 | Schubert et al. | 264/333 X |
| 656,696 | 8/1900 | Johnson et al. | 264/133 |
| 1,541,606 | 6/1925 | Wert | 264/133 X |
| 1,684,671 | 9/1928 | Hayden | 264/79 X |
| 1,768,366 | 6/1930 | McKesson | 264/79 |
| 1,779,481 | 10/1930 | Martin | 264/133 |
| 1,859,253 | 5/1932 | Cross | 264/79 |
| 1,942,000 | 1/1934 | Reynolds | 264/79 |
| 2,000,759 | 5/1935 | Johnson | 264/79 |
| 2,143,515 | 1/1939 | Hayden | 264/79 X |
| 2,193,635 | 3/1940 | Marshall | 264/133 |
| 2,522,298 | 9/1950 | Ramsay | 264/333 X |
| 2,839,811 | 6/1958 | Benedict et al. | 264/79 |
| 2,952,062 | 9/1960 | Tillman | 264/79 |
| 2,963,765 | 12/1960 | Tillman | 264/79 |
| 3,228,777 | 1/1966 | Kubie | 264/79 |
| 3,427,374 | 2/1969 | Jackson et al. | 264/133 X |
| 3,428,721 | 2/1969 | Jackson et al. | 264/133 X |
| 3,642,969 | 2/1972 | Estrada | 264/333 X |
| 3,649,725 | 3/1972 | Olson | 264/333 X |
| 3,808,299 | 4/1974 | Svensson | 264/333 X |
| 3,878,278 | 4/1975 | Miller et al. | |
| 3,904,723 | 9/1975 | Prince | 264/333 X |
| 4,015,040 | 3/1977 | Yoshida et al. | |
| 4,067,939 | 1/1978 | Lowe et al. | 264/333 X |
| 4,069,283 | 1/1978 | Ranchfuss | 264/DIG. 43 X |
| 4,177,232 | 12/1979 | Day | 264/133 |
| 4,225,651 | 9/1980 | Hutton et al. | 427/393.6 X |
| 4,297,399 | 10/1981 | Perz | 427/393.6 X |
| 4,338,135 | 7/1982 | Cook | 264/DIG. 43 X |
| 4,349,398 | 9/1982 | Kearns et al. | |
| 4,421,704 | 12/1983 | Reily | 264/133 |
| 4,439,563 | 3/1984 | Sackis et al. | |
| 4,495,319 | 1/1985 | Sackis et al. | |
| 4,582,727 | 4/1986 | Neelameggham et al. | 427/228 |
| 4,812,424 | 3/1989 | Helferich et al. | |
| 4,814,300 | 3/1989 | Helferich | |
| 4,818,602 | 4/1989 | Yoshimi et al. | |
| 4,994,328 | 2/1991 | Cogliano | 156/71 |
| 4,999,218 | 3/1991 | Rehmer et al. | 427/393.6 X |
| 5,096,748 | 3/1992 | Balassa | 427/393.6 X |
| 5,110,675 | 5/1992 | Newkirk | |
| 5,187,882 | 2/1993 | Leach | 264/333 X |

FOREIGN PATENT DOCUMENTS

| | | | |
|---|---|---|---|
| 157633 | 1/1970 | Germany | 264/333 |
| 3323509 | 1/1985 | Germany | 264/29.1 |
| 42556 | 12/1973 | Japan | 264/29.1 |
| 27989 | 2/1982 | Japan | 264/133 |
| 36991 | 3/1983 | Japan | 264/133 |
| 41785 | 3/1983 | Japan | 264/133 |
| 49680 | 3/1983 | Japan | 264/133 |
| 120581 | 7/1983 | Japan | 264/133 |
| 116183 | 7/1984 | Japan | 264/333 |
| 336326 | 5/1972 | U.S.S.R. | 264/29.1 |
| 355131 | 11/1972 | U.S.S.R. | 264/333 |
| 413131 | 5/1974 | U.S.S.R. | 264/333 |
| 833897 | 5/1981 | U.S.S.R. | 264/133 |
| 852840 | 9/1981 | U.S.S.R. | 264/333 |
| 867910 | 9/1981 | U.S.S.R. | 264/333 |
| 1416315 | 8/1988 | U.S.S.R. | 264/333 |
| WO-06083 | 8/1988 | WIPO | 264/333 |

*Primary Examiner*—Karen Aftergut
*Attorney, Agent, or Firm*—Clyde I. Coughenour

[57] ABSTRACT

A process for producing and curing hydraulic material to reduce its hydrophilic characteristics and increase its strength. By preventing water loss and by adding water, efflorescence is controlled and the number of and size of voids created by water evaporation and hydration are reduced. Controlling the cure environment, humidity, temperature and pressure and using fluid barriers and water, control the physical and chemical composition formed during curing. The controls can be used before and/or after the initial set or shape formation of the hydraulic material.

6 Claims, No Drawings

METHOD FOR PRODUCING AND CURING HYDRAULIC MATERIAL

CROSS-REFERENCE

This application is a Continuation-in-Part of applicant's prior application, Ser. No. 07/761,746 filed 17 Sep. 1991, now abandoned.

FIELD OF THE INVENTION

This invention is concerned with a method for the production and curing of hydraulic material which is effective in the prevention of cracking, warpage and water absorption. The process improves water repellency and gives high strength by controlling efflorescence and the number and size of voids and the hydration process.

DESCRIPTION OF RELATED ART

In the prior art, a number of methods have been used for curing hydraulic materials, including air-dry curing, sprinkled water curing, steam curing, moist air curing, water immersion curing, reaction heat curing, autoclave curing, etc. Expansion agents to control shrinkage and coatings to control the hydrophilic characteristics of hydraulic materials have been used. The hydraulic material can be any prehardened or hardened cement type material such as raw mortar, raw concrete, pozzolanic cement, calcium silicate cement, etc. During the normal curing process in air, the water in the mixture evaporates from the surface. Small voids form in areas of evaporation and cause a deficiency of water within the mixture near the surface. A deficiency of water results in a migration of more water to the surface and result in different chemical compositions being formed at the surface and within the mixture as the water migrates within the mixture toward the surface. The end result is a weaker hydraulic material and a material that is hydrophilic. The active ingredients of the mixture and, in particular, the calcium/calcium oxide react with carbon dioxide in the air or atmosphere to form calcium carbonate. This formation takes place at the surfaces of the hydraulic material, including within the voids formed by evaporation of water. Whenever any of the standard procedures are utilized, a great number of holes or voids still occur, resulting in the formation of water marks or water fissures caused by surface evaporation of water and the consumption of water during the hydration reactions. Porous calcium carbonate is also produced, which constitutes a source of water absorption and contributes to low strength, cracking, warpage, efflorescence or other deterioration. Efflorescent ingredients are water soluble compounds, containing mainly calcium hydroxide, produced when water is added to cement. As these efflorescent ingredients migrate toward the surface, they react with carbon dioxide in what is referred to as a first efflorescence. The efflorescent ingredients will also stick around cement particles or aggregates, dry and, with the particles or aggregates, migrate toward the surface. As evaporation of water proceeds, a reaction with carbon dioxide occurs that is referred to as secondary efflorescence. With hydration reaction heat generation, in general, such as during steam or other curing, and hydration reaction heat curing, in particular, the temperature of the hydraulic material becomes higher than that of the atmospheric temperature, and water quickly evaporates. Also, water is consumed in the hydration reaction. Additional water, needed for the reaction, cannot all be provided by the steam or atmospheric moisture. The result is a finished low strength material into which water is easily absorbed. Secondary efflorescence takes place along with the creation of porous calcium carbonate. The resulting compositions are worn down and destroyed by gel components produced in a reaction with rain water. When curing takes place in water, large quantities of gel components are produced. When the hydraulic material is removed from the water and quickly dried, porous calcium carbonate is produced. These also becoming a source of deterioration. In the case of air curing, the lack of uniformity in the evaporation between the top and the bottom results in different reactions and warpage. This warpage can easily produce cracking. The openings or water fissures formed during hydration reactions become a source of problems.

In addition, when heterogenous materials such as hardened hydraulic material or tile, or heterogenous non-hardened hydraulic material, i.e. set but not yet fully cured, and non-hardened hydraulic material are layered and hardened, warping and cracking easily occur.

SUMMARY OF INVENTION

The invention involves providing a controlled environment for shaping or curing a mortar or cement or other water reacted material to produce a hydraulic material. By controlling the moisture, temperature and/or pressure of the environment, its strength and water resistance are increased.

By controlling the environment curing is taking place in, the chemical reactions and compositions can be controlled. By preventing the evaporation of the water in the mixture by physical barriers or maintaining a high relative humidity and/or by adding water to replace that evaporated, sufficient moisture will be present to have a more complete hydration of the reactants. By prevention of evaporation of moisture and/or by providing physical barriers, carbon dioxide is kept out of contact with the reactants. This reduces or prevents the formation of calcium carbonate, both on the surface of the hydraulic material and within voids in it as curing proceeds.

By controlling the environment and/or the materials in contact with the surface of the mixture during the curing process, the chemical composition and physical characteristics of the surface area can be controlled. By controlling the surface characteristics and/or a permanent or temporary surface coating, alone or in combination with control of the environment, the time of cure and, to a degree, the chemical reactions taking place during the curing process can be controlled.

Many factors contribute to the strength and moisture resistance and general physical and chemical characteristics of hydraulic materials. Both the composition of the hydraulic material and the process used to cure are of major importance. To prevent the formation of undesirable characteristics of hydraulic materials, your applicant has devised processes whereby the strength and characteristics of hydraulic material is improved.

The process of the present invention includes one or a combination of the following steps:

a. controlling the gradient temperature between the hydraulic material and the surrounding atmosphere so that the dew point of the atmosphere in contact with the hydraulic material does not change and cause the removal of water from the hydraulic material;

b. controlling the relative humidity of the surrounding atmosphere so as not to cause the removal of water from the hydraulic material;

c. sealing the surface of the hydraulic material with a permanent or temporary membrane or covering so that the water in the hydraulic material cannot escape;

d. coating the hydraulic material with a material that prevents the escape of water from the hydraulic material or that reacts with the hydraulic material to form a permanent or temporary covering and/or that occupies or covers the voids or precludes communication between them and the surrounding atmosphere;

e. submerging the hydraulic material in a water or aqueous lime bath to preclude removal of water from the hydraulic material and/or to react with the hydraulic material and/or to replenish or replace water removed from or necessary for hydration of the hydraulic material;

f. providing a spray of water or aqueous lime for the hydraulic material to replace any water removed or to provide water necessary for hydration of the hydraulic material and/or to react with the hydraulic material;

g. providing a vapor spray with a temperature below that of the atmosphere surrounding the hydraulic material to prevent water loss without condensation of the spray onto the hydraulic material;

i. preventing condensation from falling onto the hydraulic material and causing irregular cure and different compositions in the hydraulic material;

j. providing electromagnetic waves for assisting and controlling the curing of the hydraulic material;

k. providing materials for assisting the cure and formation of a porous light yet strong hydraulic material;

l. providing layers of hydraulic materials having different weights and/or strengths.

DESCRIPTION OF THE PREFERRED EMBODIMENTS

One of the curing methods of this invention which achieves the objective is to minimize the temperature gradient between the atmospheric temperature and the temperature of the hydraulic substance. The hydration process is exothermic. This usually results in the hydraulic material being at a higher temperature than the surrounding atmosphere. When the atmosphere adjacent the hydraulic material is heated its dew point increases making it capable of absorbing more water. By maintaining the atmosphere and hydraulic material at or close to the same temperature, the dew point remains essentially constant and thus there is no increase in the ability to absorb water.

Another curing method according to this invention is one wherein a hardened or non-hardened hydraulic material is cured in a high moisture environment. The evaporation of water from the hydraulic material is directly inverse to the humidity of the surrounding atmosphere. By maintaining the atmosphere at or close to 100% relative humidity, evaporation of water from hydraulic material is reduced or eliminated.

Another method of preventing evaporation of water from the hydraulic material is to seal the surface of the hydraulic material with a permanent or temporary fluid impermeable membrane, covering or coating. A resin emulsion or composition can be used to form a membrane. When a resin membrane is formed on the exposed surface of the hydraulic material during cure, a hydraulic material can be obtained which is high in strength, water resistant, or even impermeable to water, and one in which the primary and secondary efflorescence is controlled.

Another method of preventing evaporation of water from the hydraulic material that prevents the escape of water and/or that reacts with the hydraulic material is to form a permanent or temporary covering or coating that can occupy the voids or preclude communication between them and the surrounding atmosphere. The hydraulic material can be coated with an oil or fat. By heating, carbonization or dry adhesion is promoted. With this curing method, efflorescence components in the hydraulic material are consumed by carbonization or chemical combination with the oil or fat and/or openings are covered by production of reacting substances. As a consequence, there is resistance to water absorption if not water impermeability, and there is little or no secondary efflorescence.

Curing of the hydraulic material takes place before and after it takes the shape of the mold or form it is placed in. Since it is water soluble before it sets, direct contact with water or aqueous solutions at this stage can result in destruction of the desired shape. After the hydraulic material has set, it can be placed in a water or an aqueous solution of lime bath or otherwise contacted with a water or aqueous lime solution. Another curing method according to this invention, is to take a set or non-hardened hydraulic material that has reached a point of cure where it cannot be destroyed by water. Once this point has been reached, water or an aqueous solution of lime can be placed on its upper surface, or otherwise allowed to accumulate. A thin removable membrane is formed on the surface of the hydraulic material. Before the membrane becomes fixed to the hydraulic material, water can be applied or permitted to accumulate on the hydraulic material. In this manner, the membrane can be peeled or stripped off. This circumvents the prior art need to remove the membrane by sandblasting or other means. Continuing the cure by this method prevents the evaporation of water from the hydraulic material, and provides additional water for replenishment, strengthening the hydraulic material in the process.

Rather than submerging the hydraulic material in water or an aqueous lime bath, a mist or spray of water or aqueous lime may be provided to replace any water removed or necessary for hydration during the cure of the hydraulic material. Ultrasonic waves can be used for this purpose.

Another curing procedure is to provide a vapor spray for water replacement or hydration by having the water condense onto the hydraulic material. The condensation onto the exposed surface of the hydraulic material is accomplished or assisted by having the temperature of the water vapor lower than that of the temperature within the curing chamber.

Another process for controlling secondary efflorescence is to minimize the pressure gradient during conditions of high moisture and pressure, and optionally, temperature. The combination decreases the time necessary for cure.

One of the problems encountered when using chambers or enclosures for curing under high humidity conditions is that water condenses on the ceiling and walls. The water will trickle onto the hydraulic material causing erosion or uneven curing. The trickling of water from condensation on the ceiling and walls of the curing chamber is prevented by heating them so that they will be above the dew point temperature of the surrounding atmosphere. By controlling condensation, curing can be accomplished at high temperatures and high relative humidity, and if desired, under high pressures, thereby controlling secondary efflorescence. In addition, the pressure between the inside and the outside of the hydraulic material can be adjusted so as to be approximately uniform. With this procedure, condensation on the exposed surfaces of the hydraulic material does not occur, and secondary efflorescence can be controlled.

According to this curing method, while controlling the evaporation of water from the hydraulic material, heat curing can be accomplished through the utilization of electromagnetic waves. This heating method assists the curing process while gel formation continues, lending to a higher strength product. Furthermore, by the use of electromagnetic waves as a heating source, curing can be simply accomplished without the use of a curing chamber. Uniform heating is possible and the hydraulic material can be quickly hardened. This method can be used when curing in an atmosphere in which the evaporation of the hydraulic material is suppressed, or through the formation of a resin membrane or coating or cover on the exposed surface(s) of the hydraulic material. A product can be created which is high in strength, water resistant or hydrophobic.

Another curing method according to this invention is one in which prior to curing the non-hardened hydraulic material is mixed to contain light weight aggregate and/or bubbles. Through the utilization of light aggregate material or the inclusion of bubbles, the comparative weight of hydraulic material can be reduced. In this manner hardened substances can be produced that are light in comparative weight, yet high in strength. These materials can be cured by the same procedures as other hydraulic materials.

The method of production described by this invention is one wherein utilization may or may not be made of water reduction or foaming agents. Non-hardened hydraulic material produced with water or an aqueous solution of lime may be caused to harden with bubble inclusions through the addition of a foam agent to an aqueous solution of lime, causing a reaction with the foam agent. Cure hardening may be accomplished by any of the previously cited curing methods. If use is made of an aqueous solution of lime, a reaction occurs between the aqueous solution of lime and a foam agent, the reaction materials may be utilized as an aggregate or thickener or hardened substance. A product of relatively low comparative weight can be easily produced.

With these curing methods, condensation on the exposed surfaces of the hydraulic material can be reduced or eliminated, or can be brought about to be a source of water supply to the hydraulic material. Water provided by this method can be used to replenish that evaporated and/or compensate for any water insufficiency. In view of this, gel can continue to form, resulting in a high strength product. The movement of water within the hydraulic material can be reduced or eliminated. Primary efflorescence can be beneficially controlled. When curing is accomplished under conditions of both high temperature, high pressure and high moisture, secondary efflorescence is controlled. By controlling pressure differences between the inside and the outside of the hydraulic material, there is no deterioration of the structure, but rather a large amount of gel is produced that contributes to high strength.

By the methods of this invention the curing may be accomplished by contact with an aqueous solution of lime, or by sealed curing, or by curing within an atmosphere in which the evaporation from the hydraulic material is suppressed, for more than 500 degree (C.) hours, i.e. the evaporation is suppressed at any given temperature (degrees C.) for a given time (hours) such that (degrees C.)×(hours) is greater than 500. Curing may be accomplished with the exposed surfaces being sealed with a resin membrane.

Using these curing methods a reaction can be accomplished with carbonic acid gas. Because efflorescence is not a problem, a tight compound can be obtained, with increased strength and water resistance. After an increase in weight of the hydraulic material due to exposure to water, a point of approximate stability is reached. Whether curing continues in contact with water or a seal is formed to separate the hydraulic material from its surroundings, the formation of gel continues, adding strength. When a resin membrane is formed on the exposed surface the hydraulic material curing results in a high strength water resistant, or even water impermeable product because the primary and secondary efflorescence was controlled. Remarkably few evaporation openings are present.

The material which has been cured in an aqueous solution of lime shows no elution of efflorescence. Curing in an atmosphere in which evaporation of water from the hydraulic material is suppressed, or the exposed surfaces are covered, provides an increased formation of gel and tight calcium carbonate compound formations to produce high strength and resistance to water. A material coated with oil or fat prevents the evaporation of water thereby controlling carbonation. Efflorescent compounds are consumed in hydraulic material which has been carbonized by heating, and evaporation openings are sealed when the coating is heated. A material which has been coated with a resin reduces or prevents secondary efflorescence.

By use of the above curing methods, applying each of the curing methods to a layered form, a product can be obtained in which contraction or cracking is minimized and warpage is prevented. The product has high strength, is water resistant and has strong adhesion properties.

EXAMPLES OF APPLICATIONS OF THE PROCESS

In the following examples "C:S" represents cement:sand ratio and "W/C" represents the ratio of water, or aqueous solution of lime/cement and, unless otherwise indicated, the materials used are portland cement, and as the water reduction agent, Mighty 150, a trademark used for a reduction agent made by Kao Co., Ltd.

Example 1

A raw mortar was created with a composition of C:S=1:1, W/C=40% (utilizing a water reduction agent). The mixture was placed in a 5 cm×5 cm×5 cm frame. At the time of placement in the frame, the weight of the raw mortar was 294.9 g; after seal curing for 24 hours it was removed from the frame. At this point its weight was 294.8 grams. After 4 days it was cured in water at a temperature of 21 degrees (C.). Its weight on removal was 296 g, (the increase ratio of weight was exceptionally small). Subsequently, it was subjected to high moisture curing for 9 days. (Water was placed in a container and maintained at 21 degrees (C.), so that there was no direct contact with the water). After curing, the weight was 290.9 g. Compression strength after 2 weeks was 1036 kg/sq cm.

The above "in water curing" was changed to curing in an aqueous solution of lime. The curing was accomplished in the same manner through the 4 day, 21 degree (C.) cure, i.e. until the weight change stabilized or no further change in weight was observed taking place. After a water wash the material was wiped dry, and curing was continued for 9 days at 21 degrees (C.) in a high moisture atmosphere, (using the exposed surface moisture control hydraulic material curing method). The degree of compression strength after 2 weeks was 1042 kg/sq cm, with no evidence of efflorescence.

Material in which a resin membrane was formed on the exposed surface showed no apparent secondary efflorescence. The exposed surfaces were coated with oil and heated in an electronic range at 120 degrees (C.). There was little occurrence of secondary efflorescence and, even if water was permitted to accumulate over an extended period, the slight accumulation was readily removed. Even when a test sample was covered with a non-resin membrane, the result showed resistance to water absorption.

In comparison, the weight of another sample of the same mortar at the time of its placement was 294.2 g. Following sealed curing for 24 hours, the weight at the time of removal from the form was 294 g. After air drying was continued for 12 days, the weight was 281.1 g, and the compression strength after 2 weeks was 552 kg/sq cm, a relatively low strength and a high level of water absorption.

Example 2

The mortar utilized in Example 1 was placed in a 5 cm×5 cm×5 cm frame, and after 3 hours it was submerged in a water box. Using infrared radiation, the temperature of the water was increased to approximately 80 degrees (C.), and cured for 6 hours. After returning to ordinary temperature, and after the weight change had become stabilized, it was removed from the frame. The compression strength of the mortar following one week of high moisture curing was 921 kg/sq cm.

In lieu of the referenced embodiment, frame boards may be utilized, and water can be accumulated, or a composite resin emulsion can be applied to form a membrane. Heating can be accomplished by means of infra-red radiation or an electric range may be used with similar results. An aqueous solution of lime may be substituted for water with the same results.

Example 3

The same mortar as that in Example 1 was used, half filling a 5 cm×5 cm×5 cm frame. After 2 and ½ hours, the upper half of the frame was filled with water or an aqueous solution of lime. A membrane that formed on the upper surface, peels off or floats, was removed. The next day a calcium carbonate membrane was formed on the upper surface of the water. The water was poured out, and after a simple water wash the resultant mortar had no membrane on its surface.

Raw mortar was placed in the frame, and following 2 and ½ hours the membrane could be washed away and removed even with a spray of water. The time of commencement of water accumulation, or application of water may differ slightly depending upon the temperature and other factors, but it should be at a point at which there will be no deterioration of the hydraulic material itself, even if the membrane is removed.

Example 4

Hardened mortar of the type utilized in Example 1 was covered with water, or an aqueous solution of lime, for 24 hours. Following removal the water was wiped away and a paste of W/C=43%, to which was added a cosmetic and a water reduction agent, was applied with a brush. Following exposed surface moisture control curing at 30 degrees (C.) for 24 hours, no primary efflorescence was apparent in the paste. Next, after curing in an aqueous solution of lime in a vat for 24 hours at a constant temperature of 21 degrees (C.) the material had hardened to an adhesive state and, after a water wash and wiping the water away, it was exposed to surface moisture control for more than 500 degrees (C.) hours. The resultant product showed little manifestation of secondary efflorescence. A resin membrane formed on the paste showed no secondary efflorescence. A resin membrane was formed on the mortar without submersion in water. Paste was coated or painted on it with the same results as accomplished with the above curing methods. Moreover, when, in lieu of the paste, utilization was made of a paste to which had been added a composite resin emulsion, there was an improvement in adhesion.

Example 5

Raw mortar wherein C:S=1:2, W/C=42% (utilizing a water reduction agent) is placed on fixed tiles which have been spread out, with or without layering. The result is a form having dimensions of a thickness of 5 cm, a height of 60 cm, and a width of 30 cm. Curing is accomplished with initial evaporation control of the hydraulic material, exposed surface moisture control curing, and high strength curing of a hydraulic material, high moisture curing, water accumulation curing, and air curing, where the evaporation of water from the hydraulic material is suppressed, to provide a replenishment for water insufficiency. Thereby a tight, water absorption resistant layer is formed on the exposed surface, or a composite resin membrane is formed on the exposed surface of the hydraulic material to form a high strength water absorption resistant or non-water absorbing product in which there is no apparent warpage.

Example 6

The raw mortar mixture of Example 1 was produced at 30 degrees (C.), and on its surface was spread, in layers or without layering, heterogenous source material of a water reduction agent, a cement paste which utilized a synthetic resin type emulsion, or some synthetic resin emulsion (including some cosmetic coloration pigment). Exposed surface moisture control curing was continued for 24 hours at an initial temperature of 30 degrees (C.). The material removed from the curing chamber showed no manifestation of primary efflorescence. Curing was then accomplished A) in an aqueous solution of lime for 24 hours at 30 degree (C.), or B) painted with oil or resin, or C) after 1 week was subjected to surface heating at 120 degrees (C.); all of these methods resulted in products in which secondary efflorescence was reduced or nonexistent. In addition, when the raw mortar composite described in Example 1 was placed in a form, and water or an aqueous solution of lime was allowed to accumulate on its surface, and removed from the form after 3 days, material which was then cured in the manner described above manifested little or no secondary efflorescence. The results were the same after performing curing in accordance with the methods described above was repeated 2 times.

Example 7

A (foam) slurry was created having an estimated comparative weight of 1.8 (with a water reaction weight in comparison to cement calculated at 40%) wherein C:F (fly ash) =1:0.1, W/C+F=40% (foam additive produced by Mitsuo Sogo Corp), to which was added light weight aggregate having a comparative weight of 1.0 (produced by the Uchiyama Advance Sales Corp.) at 30 degrees (C.), to form a light weight aggregate slurry and poured into a 5 cm×5 cm×5 cm frame. At an initial temperature of 30 degrees (C.), exposed surface moisture control curing was accomplished for 4 hours. After removal, it was cured in an aqueous solution of lime for 48 hours at 21 degrees (C.), and then cured for an a additional 72 hours, again at 21 degrees (C.). Observations on the 20th day showed that the comparative weight was 1.35, with compression strength being 300 Kg/sq cm. As comparative examples, the compression force of prior art hydraulic material of the same comparative weight after 4 weeks was 100–130 Kg/sq cm. Moreover, when a substitution was made with exposed surface moisture control curing, and water was permitted to accumulate on the bottom of the water vat, creating high moisture in the curing chamber, and curing was accomplished while spraying a water mist with an ultra-sonic sprayer. The compression strength on the 20th day was 308 Kg/sq cm; and while accomplishing condensation control on the inner wall surfaces of the curing chamber, where curing was accomplished while spraying a mist of water with an ultra sonic sprayer, the compression strength on the 20th day was 312 Kg/sq cm.

Example 8

A (foam) slurry is created which utilizes a foaming agent wherein C: fine silica powder (80 mesh pass) =1:0.3, with an estimated comparative weight 0.6. Commencing with a temperature of 30 degrees (C.), and an increasing gradient temperature of 5 degrees (C.) per hour, exposed surface moisture control curing was accomplished at approximately 50 degrees (C.). After removal from the form, curing was accomplished for 4–5 hours, with an increasing gradient temperature of 20 degrees (C.), until a temperature was reached of 120 degrees (C.). For the next 2 hours curing was accomplished with a gradient temperature increase of 30 degrees (C.), until a desired temperature was reached of 180 degrees (C.). Curing was maintained at 180 degrees (C.) for an additional 8 hours. The surface moisture controlled material was restored to normal temperature and pressure over a period of 3–5 hours. Its compression strength was shown to be 62 Kg/sq cm., and the primary and secondary efflorescence was controlled. Moreover, pressure increases were controlled in the same manner as were temperature increases, and the pressure within the curing chamber at 180 degrees (C.) was 10 atmospheres.

Example 9

First a slurry is created wherein C:F=1:0.1, C/aqueous lime=40%; Aqueous lime is then added to the foam agent utilized in Example 7 (active surface agent) to form a reacting foam agent. Foam created by the reaction foam agent is then added to the slurry, and mixed, thereby forming a foam slurry. Hardening is then accomplished at 30 degrees (C.), the apparent comparative weight being 0.13. Furthermore, even if a water reduction agent or a foaming agent is then added to the water or the aqueous lime to form a foam slurry, a light weight hardened substance can be created in the same manner.

The curing method for hydraulic material as described by this invention is one whereby virtually anyone can control or prevent substantial evaporation of water from the hydraulic material. Moreover, through the control of water, which is the primary component, water shortfalls may be replenished. Continuing along these lines, tests were undertaken for each curing method, and each production method in which these methods were adopted, and effective results were obtained along the lines indicated. Owing to the complexities involved, only a portion are recorded herein; other examples have been abbreviated.

This invention is not limited to the cited embodiments, but the following actual conditions apply.

(1) There is absolutely no need to make utilization of a water reduction agent; utilization may be made of any admixture.

(2) The hydraulic material is not limited to mortar; concrete or paste may also be utilized.

(3) Curing of the hydraulic material, when in the non-hardened state, can be accomplished by means of water spray curing by means of an ultra-sonic wave sprayer, by high moisture curing, by exposed surface condensation control curing, or by curing in an atmosphere in which the evaporation of water and carbonization is suppressed.

(4) When exposed surface condensation control curing is accomplished with respect to a non-hardened hydraulic material, sensors are attached to the hydraulic material whereby the temperature of the atmosphere and the hydraulic material can be adjusted so as to be approximately the same. It would be well if curing were accomplished by recording the test data into a computer to assist in adjusting the temperature. Adjustment of pressure is such that pressure increases, which accompany increases in temperature, may be used as they are. This relationship applies not only with respect to rising temperatures, but also with regard to temperatures which are caused to decline. Moreover, the initial increasing pressure gradient is within 2 atmospheric pressures an hour, and most desirably within 1 atmosphere. The test data may be recorded into a computer, following which pressure adjustments are made. To the extent possible, increasing temperature gradients should be minimized. Curing under ordinary temperature and ordinary pressure should be within 10 degrees (C.), and desirably within 5 degrees (C.), of ambient. In addition, high temperature, high moisture and high pressure curing should be accomplished within 30 degrees (C.), and desirably within 20 degrees (C.). When the temperature reaches approximately 180 degrees (C.), the hydraulic material is less likely to break with pressure differences. In addition, if curing is accomplished with an accumulation of water in the bottom of the curing chamber, the evaporation of steam is easier to control.

(5) An infrared lamp can be secured in the curing chamber, in order to increase the temperature within the curing chamber.

(6) High moisture curing may take place at ordinary temperatures using high levels of moisture, or steam may be used.

(7) Items utilized in Example 1, if applicable to other embodiments, may be utilized and applied to other embodiments to the extent that the essential components are not changed.

Efficacy of invention

By use of these processes, products are obtained that are resistant to cracking, warpage, and water absorption. The products exhibit high strength, and control efflorescence. Through the utilization of light aggregate, or foam agents, light weight, or light weight and high strength materials may also be produced. In addition, they can be effectively utilized as a surface cosmetic or protection for, wall or other board. The material can also be used for secondary materials in public works.

It is believed that the steps, operation and advantages of this process will be apparent to those skilled in the art. It is to be understood that the present disclosure is illustrative only and that changes, variations, substitutions, modifications and equivalents will be readily apparent to one skilled in the art and that such may be made without departing from the spirit of the invention as defined by the following claims.

I claim:

1. A method for surface moisture control curing of hydraulic material by performing the steps:

providing a form or mold for said hydraulic material;

placing said hydraulic material in said form or mold during initial stages of cure to set or fix a shape to said hydraulic material;

coating said hydraulic material with a fat or oily fluid impermeable material;

adhering said fat or oily fluid impermeable material to skid hydraulic material by heating said fat or oily fluid impermeable material to carbonize and harden said fat or oily fluid impermeable material onto said hydraulic material;

curing said hydraulic material with said carbonized and hardened fat or oily coating on said hydraulic material.

2. A method for surface moisture control curing of hydraulic material as set forth in claim 1 including:

removing said hydraulic material from said mold after the initial stages of cure to expose an entire surface of said hydraulic material;

coating said fat or oily fluid impermeable material over the entire exposed hydraulic material surface prior to heating.

3. A method for surface moisture control curing of hydraulic material as set forth in claim 1 including:

curing said hydraulic material by immersing said hydraulic material in a heated liquid bath.

4. A method for surface moisture control curing of hydraulic material as set forth in claim 1 including:

curing said hydraulic material by enclosing said hydraulic material in a heated gas filled chamber.

5. A method for surface moisture control curing of hydraulic material as set forth in claim 1 including:

heating said fat or oily fluid impermeable material in an electric range to carbonize and harden said fat or oily fluid impermeable material to said hydraulic material.

6. A method for surface moisture control curing of hydraulic material as set forth in claim 1 including:

mixing said hydraulic material with a light-weight aggregate prior to placing said hydraulic material in said form or mold.

* * * * *